F. W. MERRICK.
SKIVING MACHINE.
APPLICATION FILED FEB. 14, 1917.

1,268,751.

Patented June 4, 1918.
6 SHEETS—SHEET 1.

Witness
Ivan A. Blake.

Inventor
Frank W. Merrick
by Chas. F. Randall
Attorney

F. W. MERRICK.
SKIVING MACHINE.
APPLICATION FILED FEB. 14, 1917.

1,268,751.

Patented June 4, 1918.
6 SHEETS—SHEET 4.

Witness
Ivan A. Blake.

Inventor
Frank W. Merrick
by Chas. F. Randall
Attorney

UNITED STATES PATENT OFFICE.

FRANK W. MERRICK, OF BOSTON, MASSACHUSETTS, ASSIGNOR TO AMERICAN STAY COMPANY, OF BOSTON, MASSACHUSETTS, A CORPORATION OF MASSACHUSETTS.

SKIVING-MACHINE.

1,268,751.  Specification of Letters Patent.  Patented June 4, 1918.

Application filed February 14, 1917. Serial No. 148,584.

*To all whom it may concern:*

Be it known that I, FRANK W. MERRICK, a citizen of the United States, residing at Boston, in the county of Suffolk, State of Massachusetts, have invented a certain new and useful Improvement in Skiving-Machines, of which the following is a specification, reference being had therein to the accompanying drawings.

The invention has relation, more particularly, to skiving machines of the general class comprising a rotary disk cutter and a moving surface which serves as a bed for supporting the material operated upon while being skived or split in thickness. The invention comprises improvements in sectional presser-devices coöperating with the said cutter and moving surface; also, in the construction of the moving surface; and also in the construction of disk cutters. Certain of the improved features of the presser-devices, as well as the improved construction of the moving surface, are applicable to machines employing other forms of cutters.

Illustrative embodiments of the various features of the invention are illustrated in the drawings, in which latter,—

Having reference to the drawings,—

A rotary disk cutter 1 is shown attached to the lower end of an upright shaft 2, which turns in a bearing or bearings with which a support 3 upon the machine framework is furnished. Provision is made as usual for rotating the said shaft and cutter, by means of a grooved band-pulley 4 fixed upon the upper portion of shaft 2 and around which a driving-band 5 passes.

The moving surface serving as a support for the material which is being skived is shown as an endless belt or bed-apron that is mounted upon supporting and actuating cylinders or drums. Two forms or constructions of such parts are illustrated. In the case of that represented in Figs. 1 to 4 the endless belt or bed-apron is marked 6, and the cylinders or drums are marked 7,7. This belt or bed-apron is a plain one of suitable material. Figs. 9 to 17 show a form or construction comprising a belt or bed-apron of sectional character embodying certain improvements forming a part of the present invention, and described hereinafter.

The disk cutter 1 is arranged so that its cutting edge rotates in a plane that is parallel or approximately parallel with the upturned surface of the upper run of the work-supporting belt or bed-apron, and at a distance from such surface corresponding with the predetermined thickness to which the strip of leather or other material to be operated upon is to be reduced. Adjustment means of approved character for enabling the said distance to be varied at will, to provide for a desired different thickness, is employed in connection with the disk cutter in practice. In operation, the strip rests upon the upturned surface of the belt or bed-apron in being advanced or fed to the action of the cutter by movement of the belt or bed-apron, so that in passing the edge of the cutter all portions of the strip will be reduced to the thickness determined by the adjustment of the cutter vertically with relation to the said surface.

Figure 2:
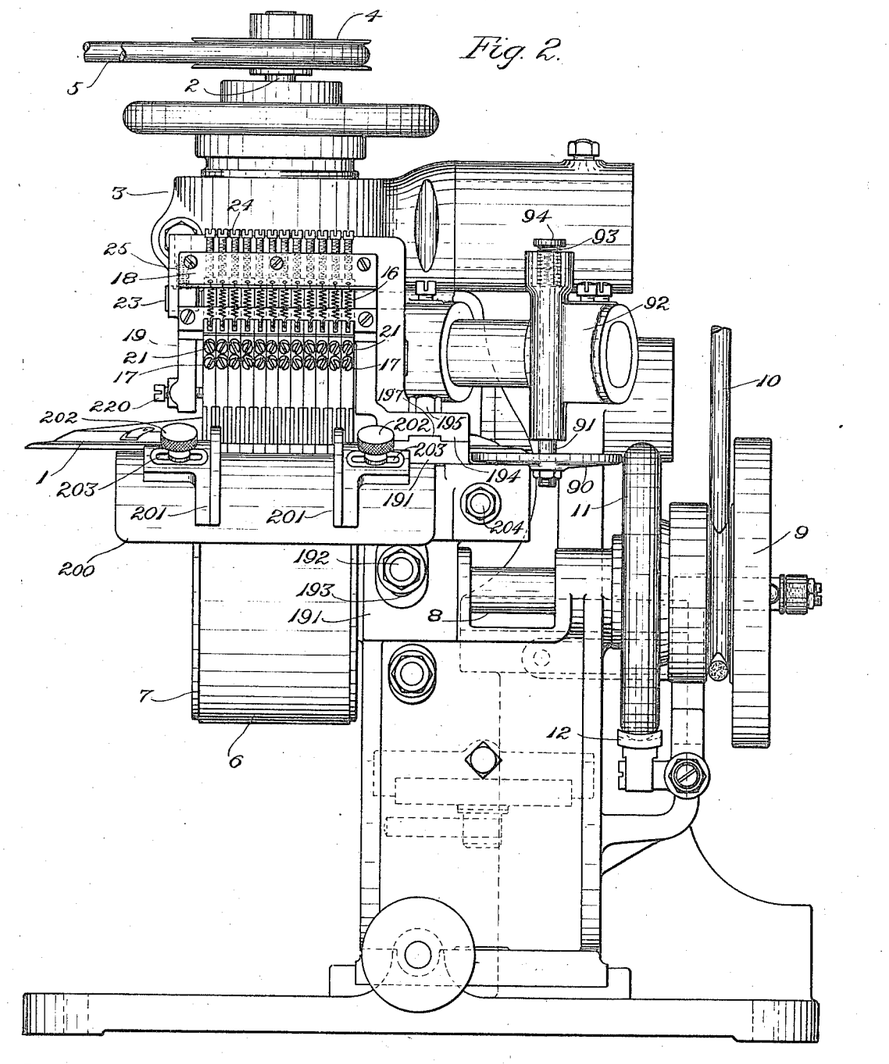
Fig. 2, Sheet 2, is an end elevation of the machine in its entirety.
Figure 3:
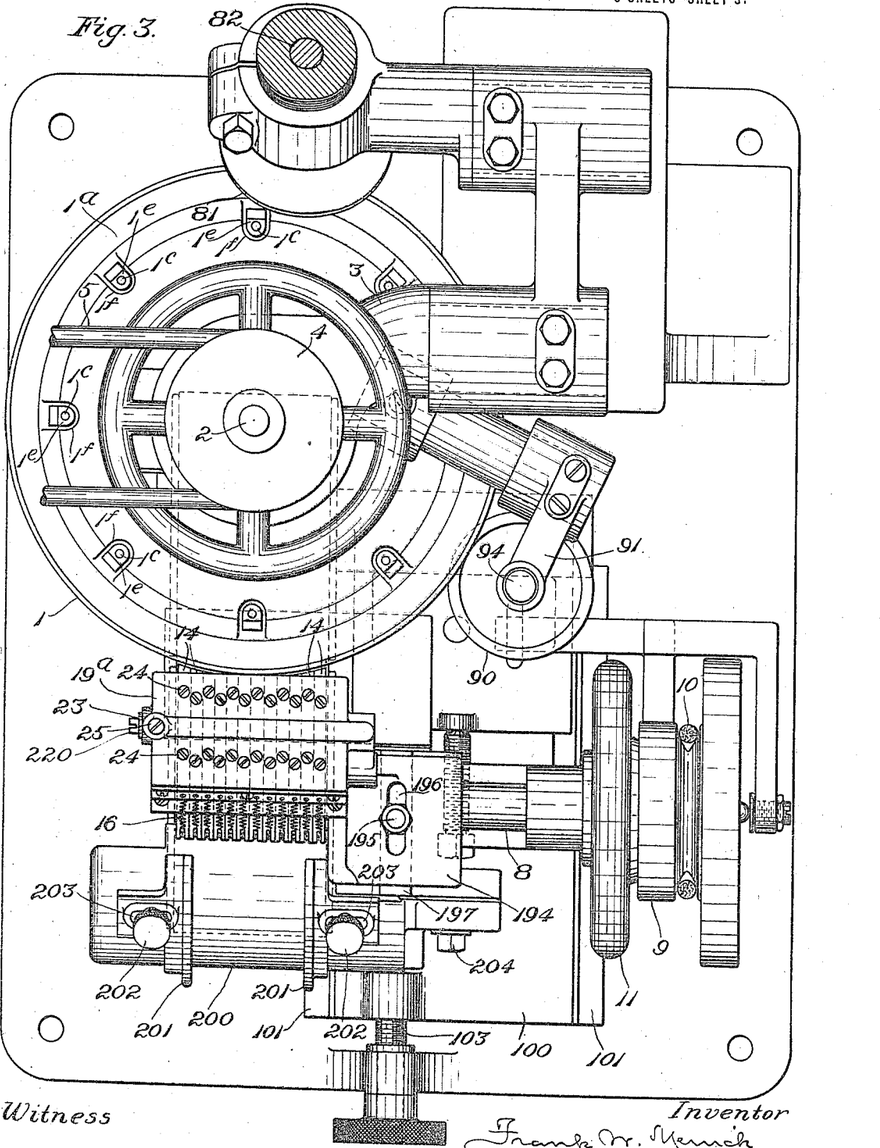
Fig. 3, Sheet 3, is a plan view thereof.

Figs. 2 and 3 show convenient means for the actuation of the work-feeding and supporting belt or bed-apron. Thus in said views the shaft 8 of one of the cylinders or drums 7 is shown as having combined therewith a loose pulley 9 receiving a driving-band 10, the said pulley having in connection therewith means, not necessary to be described in detail, whereby the operative is enabled to clutch it to the said shaft when it is desired that the bed-apron should be actuated, and to unclutch it therefrom when it is desired that the movement of the bed-apron should stop. Figs. 2 and 3 show, also, a brake-wheel 11 that is fixed upon the shaft 8, and a coacting brake-device 12 which is suitably combined with the clutch-shipping devices so as to be actuated in unison with the latter, in order to provide for bringing the bed-apron quickly to a state of rest upon the unclutching of the clutch-pulley. The clutch and brake-devices may be, in practice, of any approved character adapted to the requirements of the machine.

Figure 1:
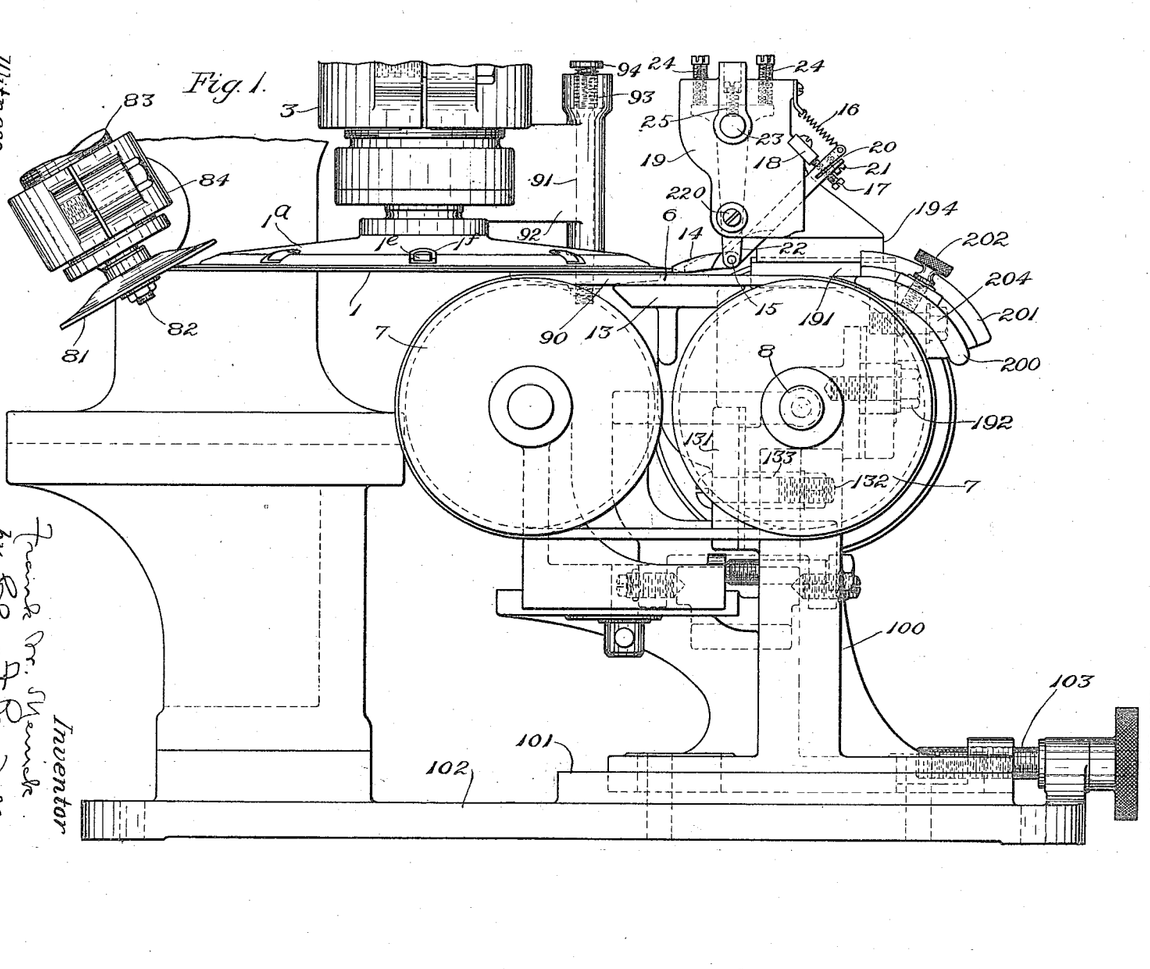
Figure 1 is a side elevation of the lower portion of a skiving machine containing certain of the said embodiments, the top portion of the machine being omitted for lack of space.
Figure 4:
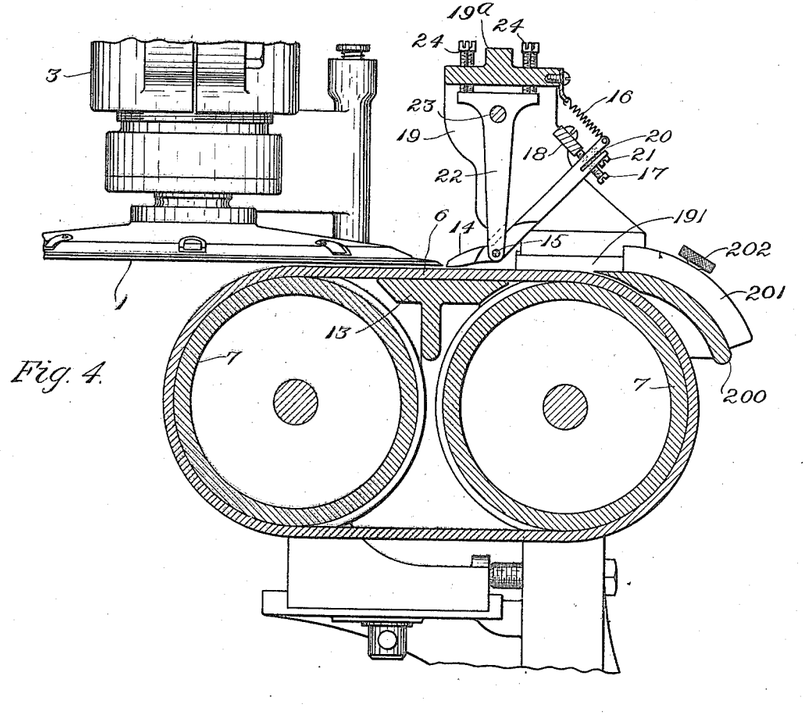
Fig. 4, Sheet 4, is a view showing certain elements thereof, partly in vertical section.

The upper run of the bed-apron 6 slides upon a supporting or backing table 13, Figs. 1 and 4, located between the two supporting and actuating cylinders 7, 7, for the bed-apron. This backing table supports or backs-up the said upper run opposite the acting portions of the work-pressers 14, 14, and the working edge of the cutter 1 at the place where the skiving action occurs.

The acting portions of the sectional work-pressers 14, 14, or presser-fingers as they may be termed also, are intended to bear upon the work at points in close proximity to the working edge of the cutter, as shown best in Figs. 3 and 4. As indicated in Fig. 3, the series of acting portions is arranged to make contact with the work on a curve concentric with said edge. Thereby such series operates to hold all portions of the width of the strip of material that is being skived, with uniform effectiveness close to the curved cutting edge of the cutter. This insures uniformity in the thickness, etc., of all said portions.

The work-pressers or presser-fingers shown in the drawings are in the form of levers of the first order, each thereof being mounted upon a pivot 15. The lower portions or arms of the said levers are the acting or work-engaging portions thereof, and the upper portions or arms of the levers have connected therewith contracting spiral springs 16 tending to actuate the levers so as to bear their acting or work-engaging portions toward the bed-apron. Suitable provision is made for limiting the approach of the work-engaging portions of the work-pressers toward the bed-apron. In the present instance, stop-screws 17, 17, are combined with the upper portions or arms of the work-pressers, these stop-screws being arranged to make contact with a stop-bar 18 upon the housing or head 19 of the presser-devices, to determine the position assumed by the pressers in the absence of material to be skived. It is intended that in the said position of the work-pressers their acting portions shall clear the upper surface of the bed-apron, so as to avoid wear of such surface. By adjustment of the stop-screws, wear of the acting portions of the work-pressers may be compensated for. As a convenient means of preventing accidental loss of adjustment of the stop-screws 17, 17, the portion of a presser or presser-finger containing the threaded hole in which its stop-screw works is split lengthwise, as at 20, at right angles to and crossing the said hole, and a cramping-screw 21 is combined with the two parts at the split so that by means of the screw 21 the said parts may be sprung relative to each other, thereby cramping or binding the stop-screw and keeping it from turning.

Figure 5:
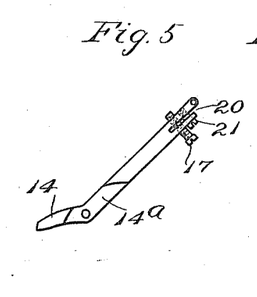
Fig. 5, Sheet 4, is a side elevation of one of the pressers of the said machine, shown detached.
Figure 6:
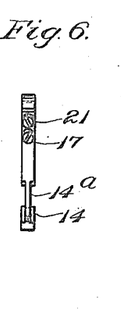
Fig. 6 is an edge view of the presser shown in Fig. 5.
Figure 7:
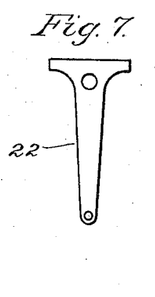
Fig. 7 is a side view of a presser-support, shown detached.
Figure 8:
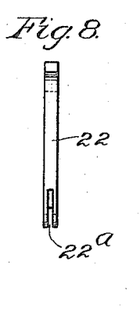
Fig. 8 is an edge view of the presser-support shown in Fig. 7.

Provision is made for adjustment of the individual work-pressers to enable their acting portions, respectively, to be brought into the required proximity to the working edge of the disk cutter. In the present instance they are mounted upon individual supports 22, 22, which are made properly adjustable. In the present instance, also, the adjustability of the said supports 22, 22, is provided for by mounting them side by side upon a supporting rod 23 which is located in the upper portion of the presser-stand or head 19. The supports 22, 22, extend downward from rod 23. Their lower ends are slotted at 22$^a$, Fig. 8, and receive in their slots, between the opposite side-portions of their forks, reduced portions 14$^a$, Figs. 5 and 6, of the work-pressers or presser-fingers. The supporting pivots 15, 15, of the work-pressers or presser-fingers are applied to the said forks and engage with the said reduced portions. For the purposes of the individual adjustment of the acting portions of the pressers or presser-fingers with relation to the edge of the cutter, the supports 22, 22, are made capable of turning or swinging upon the supporting rod 23, and convenient means of adjustment is provided in connection with such supports. In this instance, adjustment screws 24, 24, are combined with the supports 22, 22. The said screws are fitted to threaded holes that are tapped through the top-bar 19$^a$ of the presser-stand or head 19. With each individual support, oppositely-acting screws 24, 24, are combined in a manner to provide for positive adjustment of such support in both directions, and for locking the support in its adjusted position. Thus, each support has associated with it a pair of the said screws, one thereof engaging with a projection of the upper part of the support at one side of supporting rod 23, and the other thereof engaging with an oppositely extending projection of said part of the support at the other side of the said supporting rod.

To provide for convenience in disassembling the pressers or presser-fingers and their supports, as for the purpose of cleaning the parts, making repairs, or the like, the ends of the supporting-rod 23 for the supports 22, 22, are seated in holes in the side-cheeks of the presser-frame or head 19, and at least one of the said holes extends completely through the corresponding cheek as at the left in Fig. 2, and as indicated in Fig. 1, so that the said supporting-rod may be inserted into place by an endwise movement into said hole, and may be withdrawn by a reverse endwise movement. A clamping screw 25 serves as a means of keeping the supporting-rod in working position, and whenever necessary the said clamping screw may be loosened to permit the withdrawal of the rod.

The work-pressers or presser-fingers are kept close together, side by side, and in contact so that there shall be no openings or cracks between their acting portions, by means of a screw 220 having its threaded stem fitted to a threaded hole tapped in the outer cheek of the presser-stand or head, and bearing by its inner end against the outer side of the outermost support 22. Through the action of the said screw against the said support, all looseness among the series of supports is taken up and the different supports are kept close together, thereby keeping the acting portions of the work-pressers or presser-fingers also in close contact with one another, as mentioned above.

Figure 9:
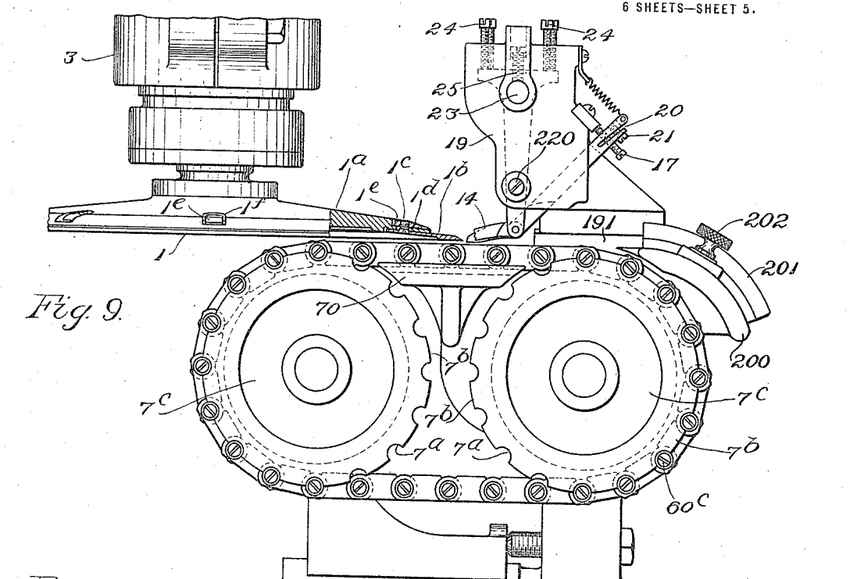
Fig. 9, Sheet 5, is a partly sectional side view showing more particularly the improvements in connection with the rotary cutter and the moving feeding and supporting surface.
Figure 10:
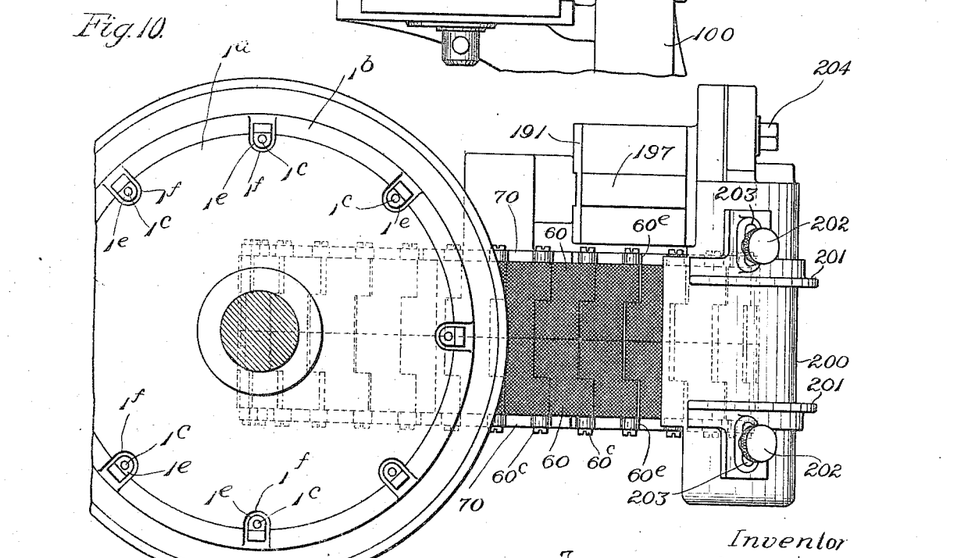
Fig. 10 is a partial view showing certain of the parts that are shown in Fig. 9, the cutter-mounting and presser-devices being omitted.
Figure 11:
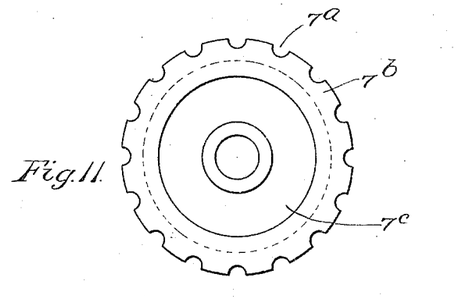
Fig. 11, Sheet 6, is an end view of one of the supporting cylinders of the endless feeding and supporting surface of Fig. 9.
Figure 12:
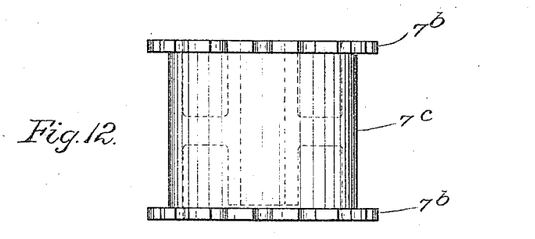
Fig. 12 is a plan view of the supporting cylinder of Fig. 11.
Figure 13:
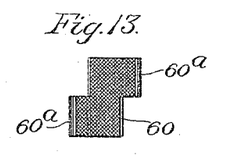
Figs. 13 to 17 are views of the blocks of one of the pairs of blocks of the endless feeding and supporting surface of Fig. 9.
Figure 14:
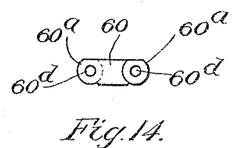
Figure 15:
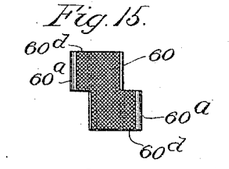
Figure 16:
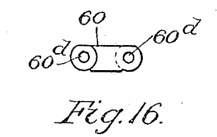
Figure 17:
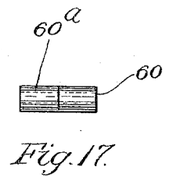

My improvement in the construction of the cutter is presented in Figs. 9 and 10, in which the cutter is shown as comprising a convenient carrier or body-portion 1$^a$ to which a narrow cutter-ring 1$^b$ is secured detachably. For the reception of the cutter-ring, the body-portion is rabbeted at the under side of its margin, as shown in Fig. 9. The cutter-ring 1$^b$ is seated in the rabbet and is held therein by means of clamping screws 1$^c$, 1$^c$, that pass upward through holes in the cutter-ring, and also through holes 1$^d$, 1$^d$, in the carrier or body-portion. The said clamping screws have nuts 1$^e$, 1$^e$, engaged with their upper portions above the carrier or body-portion. The heads of the said screws are counter-sunk in the cutter-ring, so that they do not project below the latter. The holes 1$^d$, 1$^d$, in the body-portion 1$^a$ are larger in diameter in different directions than the stems of the screws 1$^c$, 1$^c$, so that even though the circular form of the cutter-ring should change more or less during the hardening and tempering process, the screws 1$^c$, 1$^c$, after being passed through the holes in the cutter-ring may be passed through the holes 1$^d$, 1$^d$, without interference or binding against the edges of holes 1$^d$, 1$^d$. Consequently the nuts 1$^e$, 1$^e$, may be tightened so as to clamp the cutter-ring properly to the carrier or body-portion 1$^a$, without the screw-stems being caused to act against the said edges so as to strain or distort the cutter-ring. The pockets 1$^f$, 1$^f$, in the top side of the body-portion or carrier, occupied by the nuts 1$^e$, 1$^e$, are larger than the nuts so that the latter are free to shift transversely to conform to the positions of the clamping screws.

Any departure of the peripheral edge of the cutter-ring from a true circular form may be corrected by grinding. When the said ring has been so far reduced in size as to render it unsuitable for use, it may be removed and another one substituted in its place. The cost of the cutter-rings is much less than that of the cutter-disks in general use.

Figure 18:
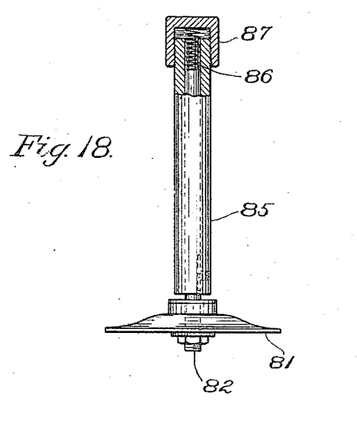
Fig. 18 is a partly sectional view of a grinder and the supporting means therefor.

A grinder-disk 81 is shown in Fig. 1 working against the bevel of the cutting edge of the cutter-ring. This grinder-disk is attached to the lower end of a spindle 82 working in a bearing 83 with which a support 84 is furnished. Spindle 82 may be held positively in contact with the said bevel by proper adjustment of the bearing 83, or its spindle may be longitudinally movable in a bearing sleeve, 85, as in Fig. 18, and be acted upon by an expanding spiral spring 86 tending to keep the acting face of the grinder-disk pressed against such bevel. Spring 86 is shown confined between the upper end of spindle 82 and a cap 87 applied to the upper end of bearing sleeve 85. At 90 is an edge straightener or grinder-disk working flatly against the under side of the cutter-ring and mounted upon the lower end of a spindle 91 rotatably mounted in a bearing in a support 92. An expanding spiral spring 93 confined between the upper end of the bearing and a flange 94 on the upper end of spindle 91 acts with a tendency to keep the disk 90 in contact with the under side of the cutter-ring.

The feeding and supporting belt or bed-apron 6 in some cases is composed of blocks or bars linked together in a flexible series. Figs. 9, 10, and 13 to 17 illustrate improvements in bed-aprons thus composed. The bed-apron shown in such views comprises blocks 60, 60, having forwardly and rearwardly projecting portions 60$^a$, 60$^a$, Figs. 13, 15, with the forwardly projecting portions interlapped with the rearwardly projecting ones, Fig. 10, so as to break the continuity of the transversely-extending joints between successive blocks. Thereby a better and more uniform supporting surface for the work is provided. The blocks are connected together to form the belt or bed-apron by means of pivotal pins which occupy transverse holes 60ᵈ, 60ᵈ, Figs. 13 to 17, in the forwardly and rearwardly projecting portions of the blocks. The ends of these pivotal pins carry rolls 60ᵉ, 60ᵉ, which are held in place by means of flanged screws 60ᶜ, 60ᶜ. The said rolls are received in notches 7ᵃ, 7ᵃ, in the flanges 7ᵇ, 7ᵇ, of the cylinders or drums 7ᶜ, 7ᶜ, used with this construction of belt or bed-apron. One of the said cylinders or drums is shown separately in Figs. 11 and 12. Fixed tracks 70, 70, located between the two cylinders or drums 7ᶜ, 7ᶜ, receive the rolls as the successive blocks leave the foremost cylinder or drum in passing to the other thereof, and thereby support the belt or bed-apron so as to prevent sagging thereof at the working place of the work-pressers and cutter. The blocks are fitted closely and carefully together at their front and rear edges. Thus, the projecting portions 60ᵃ, 60ᵃ, have vertically convex edges which are concentric with the adjacent transverse holes 60ᵈ, 60ᵈ, through the blocks, and the body-portions of the blocks have concave edges which likewise are concentric with the said transverse holes. The said convex edges and concave edges fit snugly against each other when brought together. To facilitate the making of the blocks, each is of a transverse measurement corresponding with one-half the width of the belt or bed-apron, and two block are placed side by side in each portion or section of the belt or bed-apron to form in effect one transverse bar thereof, as in Fig. 10. The two blocks composing each bar are identical in shape, but reversed, as shown, and they are reversely placed in being put together or paired for the purpose of being assembled in the belt or bed-apron, with forwardly projecting portions of the two blocks brought together at the middle of the width of the belt or bed-apron, so that they may be entered between the separated rearwardly projecting portions of the preceding pair of blocks.

The supporting cylinders or drums 7, 7, or 7ᶜ, 7ᶜ, for the work-feeding and supporting belt or bed-apron 6, are mounted upon a main stand or carriage 100, which also carries the supporting or backing table 13, or tracks 70, for the said belt or bed-apron, and the stand or head 19 of the presser-devices. The foot of this stand 100 is fitted between guides 101, 101, on the main bed or platform 102 of the machine, and is adapted to slide between such guides in the direction from front to rear and vice versa. An adjusting screw 103 having a knurled thumb-wheel is provided for convenience in making adjustment of the said main stand in such direction, and for holding such stand in adjusted position. By this adjustment the devices aforesaid may be shifted collectively toward and from the axis of the disk cutter to place the series of work-pressers as a whole in the desired proximity to the edge of the cutter, or to compensate for the reduction of the cutter in diameter by grinding, as well as to enable the closeness of approach of the acting portions of the series of work-pressers to the edge of the disk cutter to be varied according to the character of the stock being skived. When operating upon stiff stock, or taking off a comparatively thick chip or shaving, the distance of the said acting portions from the said edge should be sufficient to obviate tendency of the chip or shaving to lift the work-pressers and thereby interfere with their function of holding the stock in close contact with the belt or bed-apron. Such distance must be greater than when operating upon stock of less stiffness, or when taking off a thinner chip or shaving.

Adjustment of the supports of the work-pressers or presser-devices bodily closer to or farther from the upturned surface of the work-supporting and feeding belt or bed-apron is provided for by making the housing, stand, or head 19 of the said devices vertically adjustable with relation to the said surface. In this instance, the said housing, stand, or head is mounted upon the top of a bracket 191, which latter in turn is mounted upon the main stand 100 with capacity for being set higher or lower thereon. Thus, a downwardly-extending portion or lug of the bracket 191 is engaged by a clamping bolt 192 which binds the said bracket in place upon the main stand, and which passes through a vertical slot 193 in the said portion or lug. The said slot provides for the desired adjustment of the bracket and housing, stand, or head vertically. Independent adjustment of the said housing, stand, or head relative to the main stand, toward and from the axis of the disk-cutter is provided for by making the former adjustable upon the top of the bracket 191. In this instance, the inner cheek or side-piece of the housing, stand, or head 19 rests by means of a foot 194 upon the said top, and is clamped to the latter by means of a bolt 195, Figs. 2 and 3, the stem of which occupies a slot 196 in the said foot. The slot permits the housing, stand, or head 19 to be slid backward or forward upon the bracket-top after the bolt has been loosened. The housing, stand, or head is positioned transversely and prevented from angular displacement by means of a guide-rib 197 rising above the bracket-top and received within a groove in the under side of the foot.

On its way to the belt or bed-apron the strip which is being operated upon rests upon the curved upper surface of a guide-bar 200, and is confined transversely by means of edge-guides 201, 201, which are fastened to the said guide-bar by means of clamping screws 202, 202. The stems of said screws occupy slots 203, 203, in the feet of said edge-guides, such slots providing for lateral adjustment of the edge-guides. The guide-bar is attached to the vertical portion of bracket 191 by means of a screw 204.

The supporting and backing table 13 for the belt or bed-apron is made adjustable vertically, in order to enable it to be placed where needed to support the upper run of said belt or bed-apron properly in the required relation to other parts. To this end it is furnished with a downwardly extending foot-portion 131, Fig. 1, that is clamped to the upright portion of main stand 100 by means of a bolt 132 occupying a vertical slot 133 in the said portion of the main stand.

I claim as my invention:

1. The combination comprising a moving material-supporting surface, a disk-cutter acting in a plane adjacent the said surface upon a portion of the material which is supported by the moving surface, and a series of work-pressers making contact with the surface of the work on a curve concentric with the edge of the disk cutter and close to such edge.

2. The combination comprising a disk cutter, a moving material-supporting surface, a series of work-pressers making contact with the surface of the work on a curve concentric with the edge of the disk cutter and close to such edge, and means for adjusting the pressers individually to vary their distance from the axis of the disk cutter.

3. The combination comprising a disk cutter, material-feeding means, a series of work-pressers making contact with the surface of the work on a curve concentric with the edge of the disk cutter and close to such edge, and means for adjusting the pressers individually to vary their distance from the axis of the disk cutter.

4. The combination comprising a disk cutter, material-feeding means, a series of work-pressers making contact with the surface of the work on a curve concentric with the edge of the disk cutter and close to such edge, and individual supports for the respective work-pressers.

5. The combination comprising a cutter, material-feeding means, a series of work-pressers making contact with the surface of the work adjacent the edge of the cutter, and means for adjusting the pressers individually in a direction parallel with the plane of the cutter-edge to regulate the closeness of the same to the said edge.

6. The combination comprising a cutter, material-feeding means, a series of work-pressers making contact with the surface of the work adjacent the edge of the cutter, individual supports for the respective work-pressers, and adjustment-means for adjusting the respective supports in a direction parallel with the plane of the cutter-edge to regulate the closeness of the work-pressers to the said edge.

7. The combination comprising a cutter, material-feeding means, a series of spring-actuated work-pressers making contact with the surface of the work adjacent the edge of the cutter, individual supports for the respective work-pressers, and adjustment-means for adjusting the respective supports in a direction parallel with the plane of the cutter-edge to regulate the closeness of the work-pressers to the said edge.

8. The combination comprising a disk cutter, material-feeding means, a series of work-pressers making contact with the surface of the work on a curve concentric with the edge of the disk cutter and close to such edge, individual supports for the respective work-pressers, and adjustment-means for the said supports to vary the distance of the respective work-pressers from the axis of the disk cutter.

9. The combination comprising a disk cutter, material-feeding means, a series of individual work-presser supports, and a series of spring-actuated work-pressers mounted upon the said supports and making contact with the work adjacent the edge of the disk cutter.

10. The combination comprising a disk cutter, material-feeding means, a series of individual work-presser supports, a series of spring-actuated work-pressers mounted upon the said supports and making contact with the work adjacent the edge of the disk cutter, and adjustment-means for the said supports to vary the distance of the respective work-pressers from the axis of the disk cutter.

11. The combination comprising a cutter, material-feeding means, a series of work-pressers making contact with the surface of the work adjacent the edge of the cutter, individual pivotally-mounted supports for said work-pressers and adjustment-means for adjusting the respective supports and work-pressers in a direction parallel with the plane of the cutter-edge.

12. The combination comprising a cutter, material-feeding means, a series of work-pressers making contact with the surface of the work adjacent the edge of the cutter, individual supports for said work-pressers, and oppositely-acting adjustment-screws for adjusting the supports and work-pressers positively toward and from the edge of the cutter.

13. The combination comprising a cutter, material-feeding means, a series of work-pressers making contact with the surface of the work adjacent the edge of the cutter, individual pivotally-mounted supports for said work-pressers, and oppositely-acting adjustment-screws for adjusting the supports and work-pressers positively toward and from the edge of the cutter.

14. The combination comprising a cutter, material-feeding means, a series of work-pressers making contact with the surface of the work adjacent the edge of the cutter, individual supports for said work-pressers, and a removable pivotal mounting for the plurality of supports.

15. The combination comprising a cutter, material-feeding means, a series of work-pressers making contact with the surface of the work adjacent the edge of the cutter, individual supports for said work-pressers, and a detachable supporting head or stand for said supports.

16. The combination comprising a cutter, material-feeding means, a series of work-pressers making contact with the surface of the work adjacent the edge of the cutter, individual supports for said work-pressers, and a supporting head or stand for said supports provided with means of adjustment toward and from the edge of the cutter.

17. The combination comprising a cutter, a moving material-supporting surface, a series of pivotally-mounted spring-actuated work-pressers making contact with the surface of the work close to the edge of the cutter, and means for adjusting the pressers individually in a direction parallel with the plane of the cutter-edge to vary their distance from the said edge.

18. The combination comprising a disk cutter, a moving material-supporting surface, a series of pivotally-mounted spring-actuated work-pressers making contact with the surface of the work on a curve concentric with the edge of the disk-cutter and close to such edge, and means for adjusting the pressers individually to vary their distance from the axis of the disk-cutter.

19. The combination comprising a cutter, material-feeding means, a series of spring-actuated work-pressers making contact with the work adjacent the edge of the cutter, individual supports on which the respective work-pressers are pivotally mounted, and means for adjusting said supports in a direction parallel with the plane of the cutter-edge to locate the pressers at the desired distance relative to the said edge.

20. The combination comprising a cutter, material-feeding means, a series of spring-actuated work-pressers making contact with the work adjacent the edge of the cutter, individual pivotally-mounted supports on which the work-pressers are pivotally mounted, and means for adjusting the said supports in a direction parallel with the plane of the cutter-edge to regulate the closeness of the work-pressers to the edge of the cutter.

21. The combination comprising a cutter, material-feeding means, a series of pivotally-mounted spring-actuated work-pressers making contact with the surface of the work adjacent the edge of the cutter, and means for adjusting the said series bodily vertically relative to the plane of the work.

22. The combination comprising a cutter, material-feeding means, a series of spring-actuated work-pressers making contact with the work adjacent the edge of the cutter, a series of individual pivotally-mounted supports on which the work-pressers are pivotally mounted, and means for adjusting the series of supports bodily vertically relative to the plane of the work.

23. The combination comprising a cutter, spring-actuated pivotally-mounted work-pressers having split portions, adjustable stop-screws applied to said split portions, and cramping-screws also applied to such split portions.

24. The combination comprising a rotary cutter-body having holes exceeding in diameter in different directions the diameters of the securing screws or bolts to permit the latter to assume their own positions in such holes, a cutter-ring having holes occupied by such screws or bolts, and the said securing screws or bolts, occupying the holes, and fastening the cutter-ring to the cutter-body.

25. The combination comprising a cutter, and a traveling cutting-bed paralleling the plane in which the cutter operates, feeding the work to the action of the cutter and supporting it while being acted upon, and comprising a bed-apron composed of broad-surfaced blocks flexibly linked together and having portions interlapping with one another in the direction of the length of the bed-apron whereby the transverse joints are broken and with the projecting portions of said blocks formed with convex edges working in concavities in the opposing edges.

In testimony whereof I affix my signature in presence of two witnesses.

FRANK W. MERRICK.

Witnesses:
CHAS. F. RANDALL,
ELLEN O. SPRING.

Copies of this patent may be obtained for five cents each, by addressing the "Commissioner of Patents, Washington, D. C."